(12) United States Patent
Xiong et al.

(10) Patent No.: US 9,679,195 B2
(45) Date of Patent: Jun. 13, 2017

(54) SYSTEMS AND METHODS FOR FACIAL PROPERTY IDENTIFICATION

(71) Applicant: Tencent Technology (Shenzhen) Company Limited, Shenzhen (CN)

(72) Inventors: Pengfei Xiong, Shenzhen (CN); Hailong Liu, Shenzhen (CN); Bo Chen, Shenzhen (CN); Yan Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 3 days.

(21) Appl. No.: 14/149,970

(22) Filed: Jan. 8, 2014

(65) Prior Publication Data
US 2014/0341422 A1 Nov. 20, 2014

Related U.S. Application Data

(63) Continuation of application No. PCT/CN2013/085374, filed on Oct. 17, 2013.

(30) Foreign Application Priority Data

May 10, 2013 (CN) .......................... 2013 1 0172492

(51) Int. Cl.
*G06K 9/00* (2006.01)
(52) U.S. Cl.
CPC .................... *G06K 9/00275* (2013.01); *G06K 2009/00322* (2013.01)

(58) Field of Classification Search
CPC ........... G06K 9/00288; G06K 9/00221; G06K 2009/00322; G06K 9/00281;
(Continued)

(56) References Cited

U.S. PATENT DOCUMENTS 7,319,779 B1    1/2008   Mummareddy et al.
7,505,621 B1 *  3/2009   Agrawal ............ G06K 9/00288
                                                  382/118

(Continued)

FOREIGN PATENT DOCUMENTS

CN    1635543 A    7/2005
CN    1967561 A    5/2007

(Continued)

OTHER PUBLICATIONS

Guodong Guo, Guowang Mu, Yun Fu, Thomas S. Huang "Human Age Estimation Using Bio-inspired Features", IEEE 2009.*

(Continued)

*Primary Examiner* — Siamek Harandi
*Assistant Examiner* — Shaghayegh Azima
(74) *Attorney, Agent, or Firm* — Jones Day

(57) ABSTRACT

Systems and methods are provided for facial property identification. For example, an image sample is acquired; a first effective area image of a face is acquired in the image sample; first textural features of the first effective area image are extracted; and the first textural features of the first effective area image are classified by race, gender and age using a race classifier, a gender classifier and an age classifier successively to obtain a race property, a gender property and an age property of the face.

4 Claims, 7 Drawing Sheets

(58) Field of Classification Search

CPC ........... G06K 9/00302; G06K 9/00677; G06K 9/00248; G06K 9/00268; G06K 9/00664; G06K 9/46; G06K 9/6256; G06K 9/6267; G06K 9/6269; G06K 9/6278; G06K 9/6292; G06K 9/00275

USPC .......................................... 382/103, 159, 195

See application file for complete search history.

(56) References Cited

U.S. PATENT DOCUMENTS

| | | | | |
|---|---|---|---|---|
| 7,912,246 | B1* | 3/2011 | Moon | G06K 9/00221 382/103 |
| 8,027,521 | B1* | 9/2011 | Moon | G06K 9/00288 382/118 |
| 8,520,906 | B1* | 8/2013 | Moon | G06K 9/6263 382/118 |
| 8,705,875 | B1* | 4/2014 | Ricanek, Jr. | G06K 9/00288 382/159 |
| 2004/0066966 | A1* | 4/2004 | Schneiderman | G06K 9/527 382/159 |
| 2004/0228528 | A1* | 11/2004 | Lao | G06K 9/00221 382/167 |
| 2012/0140069 | A1* | 6/2012 | Ding | H04H 60/31 348/143 |
| 2012/0308087 | A1* | 12/2012 | Chao | G06K 9/00221 382/115 |
| 2012/0320181 | A1* | 12/2012 | Hong | G06K 9/00281 348/78 |
| 2013/0121584 | A1* | 5/2013 | Bourdev | G06K 9/00281 382/190 |
| 2013/0254143 | A1* | 9/2013 | Ueki | G06N 7/005 706/12 |
| 2014/0016871 | A1* | 1/2014 | Son | G06K 9/46 382/201 |
| 2014/0156398 | A1* | 6/2014 | Li | G06Q 30/0251 705/14.53 |
| 2014/0201126 | A1* | 7/2014 | Zadeh | G06K 9/627 706/52 |
| 2014/0215504 | A1* | 7/2014 | Hsiao | H04N 21/4668 725/10 |
| 2014/0334734 | A1* | 11/2014 | Xiong | G06K 9/00288 382/195 |

FOREIGN PATENT DOCUMENTS

| | | |
|---|---|---|
| CN | 101584575 A | 11/2009 |
| CN | 101706874 A | 5/2010 |
| CN | 101996308 A | 3/2011 |
| CN | 102708497 A | 10/2012 |
| CN | 102902986 A | 1/2013 |
| WO | WO 2012/104830 A1 | 8/2012 |

OTHER PUBLICATIONS

Serre, T.; Wolf, L.; Poggio, T., "Object recognition with features inspired by visual cortex," Computer Vision and Pattern Recognition, 2005. CVPR 2005. IEEE Jun. 20-25, 2005.*

Dongjin Song and Dacheng Tao, "Biologically Inspired Feature Manifoldfor Scene Classification", IEEE, Jan. 2010.*

China Patent Office, Office Action issued Oct. 8, 2015, in Application No. 201310172492.8

Patent Cooperation Treaty, International Search Report, PCT/CN2013/085374, Feb. 20, 2014.

Patent Cooperation Treaty, International Preliminary Report on Patentability, PCT/CN2013/085374, Nov. 10, 2015.

Patent Cooperation Treaty, Written Opinion of the International Searching Authority, PCT/CN2013/085374, Feb. 20, 2014.

China Patent Office, Office Action issued Sep. 2, 2016, in Application No. 201310169175.0.

China Patent Office, Office Action issued Oct. 10, 2015, in Application No. 201310169175.0.

China Patent Office, Office Action issued Apr. 5, 2016, in Application No. 201310169175.0.

Fu, Yun et al., Age Synthesis and Estimation via Faces: A Survey, IEEE Transactions on Pattern Analysis and Machine Intelligence, 32(11), pp. 1955-1976, Nov. 2010.

Patent Cooperation Treaty, International Search Report, PCT/CN2013/088173, mailed Feb. 20, 2014.

Patent Cooperation Treaty, Written Opinion of the International Searching Authority, PCT/CN2013/088173; mailed Feb. 20, 2014.

Patent Cooperation Treaty, International Preliminary Report on Patentability, PCT/CN2013/088173; issued Nov. 10, 2015.

United States Patent and Trademark Office, Office Action dated Feb. 4, 2016, in U.S. Appl. No. 14/265,846.

United States Patent and Trademark Office, Office Action dated Jun. 16, 2016, in U.S. Appl. No. 14/265,846.

Wang, Xianmei et al.; Age Estimation by Facial Image: A Survey; Journal of Image and Graphics, 17(6); pp. 603-618; Jun. 2012.

United States Patent and Trademark Office, Notice of Allowance mailed Dec. 9, 2016, in U.S. Appl. No. 14/265,846.

* cited by examiner

SYSTEMS AND METHODS FOR FACIAL PROPERTY IDENTIFICATION

CROSS-REFERENCES TO RELATED APPLICATIONS

This application is a continuation of International Application No. PCT/CN2013/085374, with an international filing date of Oct. 17, 2013, now pending, which claims priority to Chinese Patent Application No. 201310172492.8, filed May 10, 2013, both applications being incorporated by reference herein for all purposes.

FIELD OF THE INVENTION

Certain embodiments of the present invention are directed to computer technology. More particularly, some embodiments of the invention provide systems and methods for facial property identification. But it would be recognized that the invention has a much broader range of applicability.

BACKGROUND OF THE INVENTION

With the development of information technology and the popularity of network technology, people increasingly use various types of image collection equipments in daily lives, such as a surveillance camera, a digital camcorder, a network camera, a digital camera, a cell phone camera and a video sensor of Internet-of-Things, to acquire a large amount of images and video data. Rapid and intelligent analysis of such a large amount of images and video data is urgently needed.

Facial identification technology can analyze images and video data intelligently. Race, gender and age are three major properties for facial identification because these properties describe a social background, behavioral principles and a living status of a person. These major properties can be reflected on a person's face. A solution is needed regarding how to obtain data related to these three properties according to certain input images.

Hence it is highly desirable to improve the techniques for facial property identification.

BRIEF SUMMARY OF THE INVENTION

According to one embodiment, a method is provided for facial property identification. For example, an image sample is acquired; a first effective area image of a face is acquired in the image sample; first textural features of the first effective area image are extracted; and the first textural features of the first effective area image are classified by race, gender and age using a race classifier, a gender classifier and an age classifier successively to obtain a race property, a gender property and an age property of the face.

According to another embodiment, a system for facial property identification includes: a test-sample-acquisition module, an effective-area-image-acquisition module, a textural-feature-extraction module, and a facial-property-identification module. The test-sample-acquisition module is configured to acquiring an image sample. The effective-area-image-acquisition module is configured to acquire a first effective area image of a face in the image sample. The textural-feature-extraction module is configured to extract first textural features of the first effective area image. The facial-property-identification module is configured to classify the first textural features of the first effective area image by race, gender and age using a race classifier, a gender classifier and an age classifier successively to obtain a race property, a gender property and an age property of the face.

According to yet another embodiment, a non-transitory computer readable storage medium includes programming instructions for facial property identification. The programming instructions are configured to cause one or more data processors to execute operations. For example, an image sample is acquired; a first effective area image of a face is acquired in the image sample; first textural features of the first effective area image are extracted; and the first textural features of the first effective area image are classified by race, gender and age using a race classifier, a gender classifier and an age classifier successively to obtain a race property, a gender property and an age property of the face.

For example, the systems and methods provided herein are configured to perform facial property identification using race classifiers, gender classifiers and age classifiers to replace a traditional manual method or a traditional equipment inspection method used in security monitoring so as to improve efficiency and accuracy and reduce cost.

Depending upon embodiment, one or more benefits are achieved. These benefits and various additional objects, features and advantages of the present invention are fully appreciated with reference to the detailed description and accompanying drawings that follow.

DETAILED DESCRIPTION OF THE INVENTION

Figure 1:
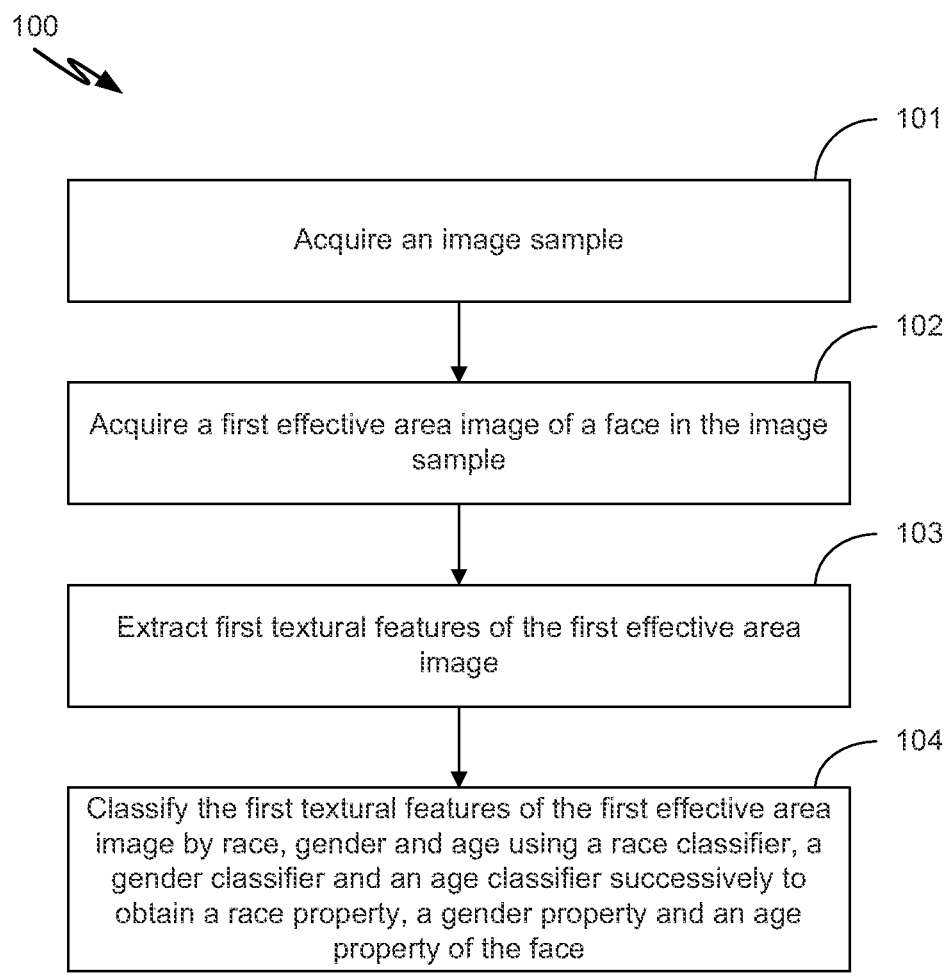
FIG. 1 is a simplified diagram showing a method for facial property identification according to one embodiment of the present invention.

FIG. 1 is a simplified diagram showing a method for facial property identification according to one embodiment of the present invention. This diagram is merely an example, which should not unduly limit the scope of the claims. One of ordinary skill in the art would recognize many variations, alternatives, and modifications. The method 100 includes at least the process 101 for acquiring an image sample, the process 102 for acquiring a first effective area image of a face in the image sample, the process 103 for extracting first textural features of the first effective area image, and the process 104 for classifying the first textural features of the first effective area image by race, gender and age using a race classifier, a gender classifier and an age classifier successively to obtain a race property, a gender property and an age property of the face.

According to one embodiment, before the process 102, the method 100 further includes a process for establishing a race classifier, a gender classifiers and an age classifier successively. For example, the process for establishing a race classifier, a gender classifiers and an age classifier successively includes: acquiring a training image sample collection; acquiring a second effective area image in an image sample in the training image sample collection: extracting second textural features of the second effective area image; and establishing the race classifier, the gender classifier and the age classifier successively based on at least information associated with the second textural features of the second effective area images in the training image sample collection.

According to another embodiment, the process for establishing the race classifier based on at least information associated with the second textual features in the training image sample collection includes: dividing the training sample collection into white training samples, black training samples and yellow training samples corresponding to a white race, a black race and a yellow race respectively; and training third textural features of the white training samples, the black training samples and the yellow training samples separately to obtain a ternary classifier associated with the white race, the black race and the yellow race. For example, the process for establishing the gender classifier based on at least information associated with the second textural features in the training image sample collection includes: dividing the white training samples, the black training samples and the yellow training samples by gender to obtain gender samples of each race; and training fourth textural features of the gender samples of each race separately to obtain a gender binary classifier associated with each race, wherein the binary classifier corresponds to male and female. In another example, the process for establishing the age classifier based on at least information associated with the second textural features in the training image sample collection includes: dividing the gender samples of each race by age groups to obtain infant training samples, child training samples, youth training samples and senior training samples; training the infant training samples, the child training samples, the youth training samples and the senior training samples to establish a first-level age classifier; training fifth textural features of second-level training samples associated with an age interval of five years related to the infant training samples, the child training samples, the youth training samples and the senior training samples to establish a second-level age classifier; and training a linearly-fit third-level age classifier for the infant training samples, the child training samples, the youth training samples and the senior training samples based on at least information associated with an age interval of five years.

According to yet another embodiment, the process 102 includes: detecting the face in the image sample; determining eye positions on the face; calibrating an original image of the face based on the eye positions on the face; and obtaining the first effective area image of the face within a predetermined area centering on the eyes of the face. For example, the process for extracting first textural features of the first effective area image includes: extracting biologically inspired model (BIM) features within the first effective area image of the face. In another example, the process for extracting BIM features within the first effective area image of the face includes:

a) establishing 64 sets of gabor filters and filtering the first effective area image of the face in 16 scales and 4 orientations using the 64 sets of gabor filters to obtain a gabor image;

b) dividing the gabor image into 8 parts, wherein a part includes two scales and four orientations;

c) in an orientation of a part, selecting one set of m×n masks and dividing the gabor image to obtain two sets of serial gabor features; and d) comparing gabor features corresponding to the two scales of the part and taking a higher value of corresponding feature dimensions as a final feature output.

In addition, the process for extracting BIM features within the first effective area image of the face includes: adjusting sizes of the masks; and repeating the operations c)-d) for k times to obtain k×4×8 sets of BIM features of the first effective area image of the face. For example, m, n and k are positive integers. In some embodiments, the method 100 further includes a process for performing principal component analysis (PCA) dimensionality reduction on the k×4×8 sets of BIM features to obtain the first textual features.

In one embodiment, the process 104 includes: classifying the first textural features of the first effective area image by race with a race classifier to obtain a race property of the face; selecting a gender classifier corresponding to the race property of the face; classifying the first textural features of the first effective area image by gender with the gender classifier to obtain a gender property of the face; selecting an age classifier corresponding to the race property and the gender property of the face; and classifying the first textural features of the first effective area image by age with the age classifier to obtain an age property of the face. For example, the process for selecting a gender classifier corresponding to the race property of the face and the classifying the first textual features of the first effective area image by gender with the gender classifier to obtain a gender property of the face includes: selecting a first-level age classifier corresponding to the race property and the gender property of the face; inputting the first textural features of the first effective area image into the first-level age classifier to obtain first-level age groups corresponding to the first effective area image and first weights of the first-level age groups; selecting a second-level age classifier according to a particular first-level age group with a highest first weight among the first-level age groups; inputting the first textural features of the first effective area image into the second-level age classifier to obtain second-level age groups corresponding to the first effective area image and second weights of the second-level age groups; selecting a third-level age classifier according to a particular second-level age group with a highest second weight among the second-level age groups; inputting the first textural features of the first effective area image into the third-level age classifier to obtain a third-level age corresponding to the first effective area image; and obtaining an age property of the face according to the third-level age, the first weights of the first-level age groups and the second weights of the second-level age groups.

Figure 2:
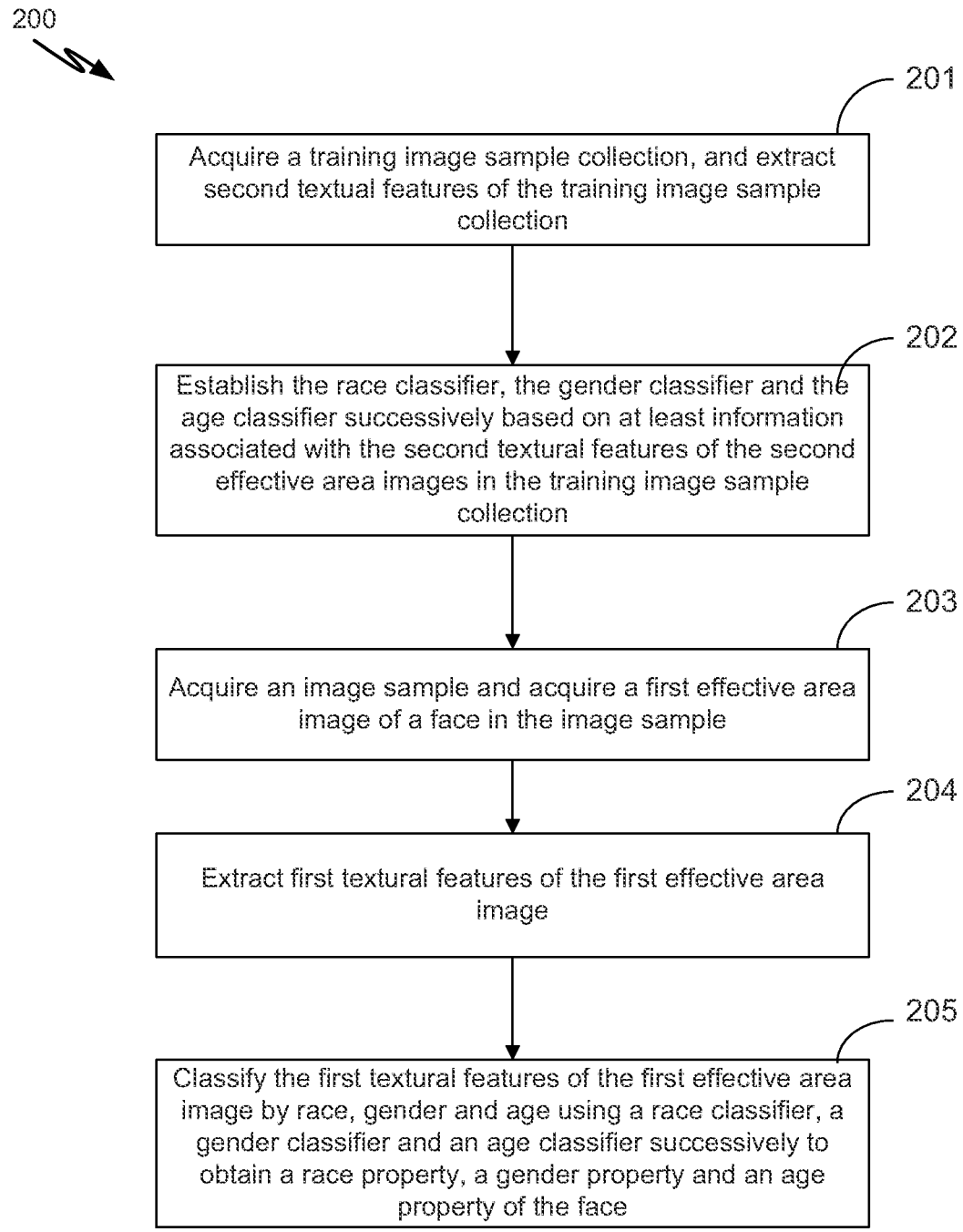
FIG. 2 is a simplified diagram showing a method for facial property identification according to another embodiment of the present invention.

FIG. 2 is a simplified diagram showing a method for facial property identification according to another embodiment of the present invention. This diagram is merely an example, which should not unduly limit the scope of the claims. One of ordinary skill in the art would recognize many variations, alternatives, and modifications. The method 200 includes at least the processes 201-205.

According to one embodiment, during the process 201, a training image sample collection is acquired, and second textual features of the training image sample collection are extracted. For example, the training image sample collection includes a plurality of facial images of different races, genders and ages. As an example, the facial images include photos and frames in a video stream. In some embodiments, the process for extracting second textual features of the training image sample collection includes: acquiring a second effective area image in an image sample in the training image sample collection; and extracting second textural features of the second effective area image. For example, the process for acquiring a second effective area image in an image sample in the training image sample collection includes: detecting a face in the image sample; determining eye positions on the face; calibrating an original image of the face based on the eye positions on the face; and obtaining the second effective area image of the face within a predetermined area centering on the eyes of the face. As an example, the predetermined are covers an effective area image in a size of 64×64 centering the eyes. In certain embodiments, an adaboost algorithm and a haar characteristic algorithm are used to acquire the position of a facial frame in the original image and then the position of eyes in the facial frame. In another example, a 64×64 effective area centered on the eyes is extracted as the facial image. As an example, the facial image is subject to a Point Divid Arithmetic Mean (PDAM) illumination treatment in order to preclude environmental interferences.

Figure 3:
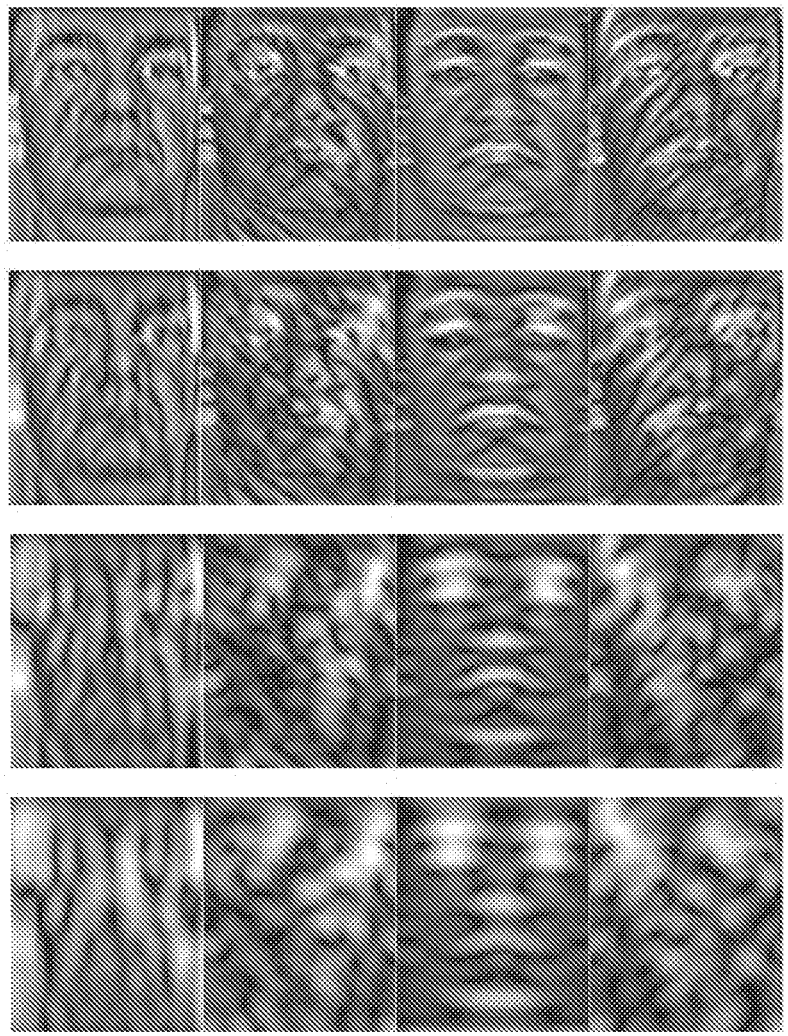
FIG. 3 is a simplified diagram showing certain gabor images according to one embodiment of the present invention.

FIG. 3 is a simplified diagram showing certain gabor images according to one embodiment of the present invention. This diagram is merely an example, which should not unduly limit the scope of the claims. One of ordinary skill in the art would recognize many variations, alternatives, and modifications.

Figure 4:
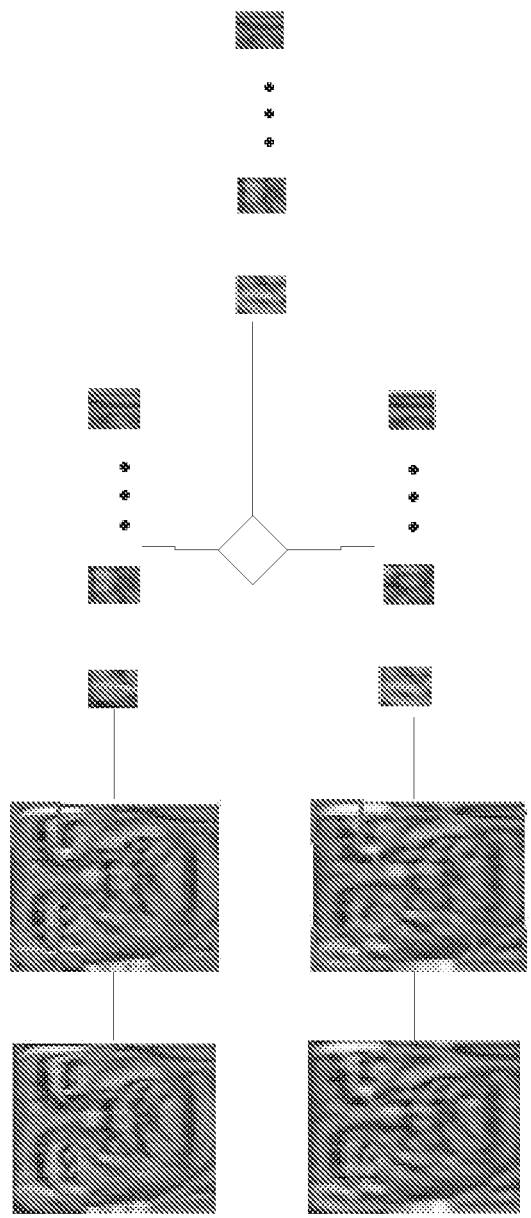
FIG. 4 is a simplified diagram showing a process for extracting BIM features from a gabor image according to one embodiment of the present invention.

FIG. 4 is a simplified diagram showing a process for extracting BIM features from a gabor image according to one embodiment of the present invention. This diagram is merely an example, which should not unduly limit the scope of the claims. One of ordinary skill in the art would recognize many variations, alternatives, and modifications.

Referring back to FIG. 2, the process for extracting second textural features of the second effective area image includes: extracting BIM features within the second effective area image of the face, in some embodiments. For example, the process for extracting BIM features within the second effective area image of the face includes:

a) establishing 64 sets of gabor filters and filtering the second effective area image of the face in 16 scales and 4 orientations using the 64 sets of gabor filters to obtain a gabor image (e.g., as shown in FIG. 3);
b) dividing the gabor image into 8 parts, wherein a part includes two scales and four orientations;
c) in an orientation of a part, selecting one set of m×n masks and dividing the gabor image to obtain two sets of serial gabor features; and
d) comparing gabor features corresponding to the two scales of the part and taking a higher value of corresponding feature dimensions as a final feature output.

In addition, the process for extracting BIM features within the second effective area image of the face includes: adjusting sizes of the masks; and repeating the operations c)-d) for k times to obtain k sets of BIM features, in some embodiments. For example, k×4 sets of BIM features are obtained for each part. As shown in FIG. 4, eventually, k×4×8 sets of BIM features of the second effective area image of the face are obtained. For example, m, n and k are positive integers. As an example, in the calculation of BIM features, filter parameters and mask sizes can be adjusted.

In one embodiment, if feature dimensions are too high, eight parts are integrated as one part so that the feature in each orientation corresponds to a highest value of the features of different masks to eventually obtain k×4 sets of features. For example, after obtaining k×4×8 sets of BIM features of the second effective area image of the face, principal component analysis (PCA) dimensionality reduction is performed on the k×4×8 sets of BIM features to obtain the second textual features.

Referring back to FIG. 2, during the process 202, the race classifier, the gender classifier and the age classifier are established successively based on at least information associated with the second textural features of the second effective area images in the training image sample collection. For example, the race classifier, the gender classifier and the age classifier are established successively based on all training samples, and based on various methods, such as a decision-making tree and a gentleboost. As shown in FIG. 3, a Support Vector Machine (SVM) classifier is used, in some embodiments.

In one embodiment, the process for establishing the race classifier based on at least information associated with the second textual features in the training image sample collection includes: dividing the training sample collection into white training samples, black training samples and yellow training samples corresponding to a white race, a black race and a yellow race respectively; and training third textural features of the white training samples, the black training samples and the yellow training samples separately to obtain a ternary classifier associated with the white race, the black race and the yellow race. For example, positive samples of each classifier correspond to all samples of a particular race and negative samples correspond to all samples for other races. As an example, training is performed on the positive samples and the negative samples to obtain a ternary classifier as follows:

$$f_t(x) = \begin{cases} 0 & x \notin Sam_t \\ 1 & x \in Sam_t \end{cases} \quad t = \{w, b, y\} \quad (1)$$

where $f_w$, $f_b$, $f_y$ correspond to a classifier for each race respectively, and $Sam_w$ represents sample features of a corresponding race. For example, the race classification result corresponds to a sum of outputs of all race classifiers as follows:

$$f_{race}(x) = \Sigma(f_w(x) + f_b(x) + f_y(x)) \quad (2)$$

In another embodiment, the process for establishing the gender classifier based on at least information associated with the second textural features in the training image sample collection includes: dividing the white training samples, the black training samples and the yellow training samples by gender to obtain gender samples of each race; and training fourth textural features of the gender samples of each race separately to obtain a gender binary classifier associated with each race, wherein the binary classifier corresponds to male and female. For example, a gender classifier is trained for each race, which means there are three binary classifiers $f^w_{gender}$, $f^b_{gender}$, $f^y_{gender}$. As an example, for all white samples, white males are taken as the positive samples and white females as the negative samples. The positive samples and the negative samples are trained to obtain the classification function for the white race $f^w_{gender}$ as follows:

$$f_{gender}^{w}(x) = \begin{cases} 0 & x \in Sam_w^f \\ 1 & x \in Sam_w^m \end{cases} \quad (3)$$

Similarly, the classification functions for the black race and the yellow race are trained with the black samples and the yellow samples respectively, in some embodiments.

$$f_{gender}^{b}(x) = \begin{cases} 0 & x \in Sam_b^f \\ 1 & x \in Sam_b^m \end{cases} \quad (4)$$

$$f_{gender}^{y}(x) = \begin{cases} 0 & x \in Sam_y^f \\ 1 & x \in Sam_y^m \end{cases} \quad (5)$$

As an example, the training samples are divided into six classes by gender under different races.

In yet another embodiment, the process for establishing the age classifier based on at least information associated with the second textural features in the training image sample collection includes: dividing the gender samples of each race by age groups to obtain infant training samples, child training samples, youth training samples and senior training samples; training the infant training samples, the child training samples, the youth training samples and the senior training samples to establish a first-level age classifier; training fifth textural features of second-level training samples associated with an age interval of five years related to the infant training samples, the child training samples, the youth training samples and the senior training samples to establish a second-level age classifier; and training a linearly-fit third-level age classifier for the infant training samples, the child training samples, the youth training samples and the senior training samples based on at least information associated with an age interval of five years. For example, the age classifiers are trained for each gender under each race. The age classifiers include three levels, in some embodiments. First, the training samples are divided into infants (0-2), children (5-12), youths (20-40) and seniors (above 55) for both genders under each race. For example, the samples of a current age group are the positive samples, $f_{age}^{0-2}(x)$, $f_{age}^{5-12}(x)$, $f_{age}^{20-40}(x)$ and $f_{age}^{55}(x)$, and the samples of other age groups are negative samples. As an example, a first-level classifier is:

$$f_{age}^{1}(x) = \Sigma(f_{age}^{0-2}(x) + f_{age}^{5-12}(x) + f_{age}^{20-45}(x) + f_{age}^{55-100}(x)) \quad (6)$$

Then a second-level classifier $f_{age}^{2}$ is established under each age group based on an age interval of five years, as follows:

$$f_{age}^{2}(x) = \Sigma(\Sigma f_{age}^{5*(k-1)-5*k}(x)) \quad (7)$$

where k represents a $k^{th}$ 5-year interval under the current age group. For example, the age group of 20-40 is divided into four sub-groups and the range of the first age sub-group is $(5 \times (1-1)=0 \sim 5 \times 1=5)+20$, which can be simplified to $5 \times (k-1) \sim 5 \times k$. In some embodiments, a third-level linearly-fit age classifier $f_{age}^{3}$ is trained for each 5-year interval, $$f_{age}^{3} = ax^2 + bx + c \quad (8)$$

As the difference is limited between different ages, direct and rigid sectioning may make the differences between the samples of two adjacent classes very small, for example. The first-level age classifier uses discontinuous age sectioning, for example, infants (0-2) and children (5-12) with an interval of 3-4 years between the two age groups, so that the samples under each class can better describe the textural information of the class to improve the performance of the classification, in some embodiments.

In certain embodiments, the processes 201-202 correspond to the specific processes to establish the race classifier, the gender classifier and the age classifier. For example, the processes 201-202 are omitted if certain property classifiers have been established.

According to one embodiment, during the process 203, an image sample is acquired, and a first effective area image of a face is acquired in the image sample. For example, the facial property identification is performed to acquire an image sample to be tested, where the image sample includes a photo or a video stream acquired via a camcorder. As an example, the process 203 is similar to the acquisition sub-process the process 201.

According to another embodiment, during the process 204, first textural features of the first effective area image are extracted. The process 204 is similar to the extraction sub-process of the process 201. For example, during the process 205, the first textural features of the first effective area image are classified by race, gender and age using a race classifier, a gender classifier and an age classifier successively to obtain a race property, a gender property and an age property of the face. As an example, the process 205 includes: classifying the first textural features of the first effective area image by race with a race classifier to obtain a race property of the face; selecting a gender classifier corresponding to the race property of the face; classifying the first textual features of the first effective area image by gender with the gender classifier to obtain a gender property of the face; selecting an age classifier corresponding to the race property and the gender property of the face; and classifying the first textural features of the first effective area image by age with the age classifier to obtain an age property of the face.

According to yet another embodiment, the first textural features of the first effective area image of the face to be tested are input into the equation (3) and race=max($f_{race}(x)$), so as to obtain the race property of the face. For example, if the race property is yellow, a gender classifier for the yellow race is selected, and the first textural features of the first effective area image of the face to be tested are input into the equation (5) so as to obtain the gender property of the face. As an example, the gender property is female.

In some embodiments, the process for selecting a gender classifier corresponding to the race property of the face and the classifying the first textual features of the first effective area image by gender with the gender classifier to obtain a gender property of the face includes: selecting a first-level age classifier corresponding to the race property and the gender property of the face; inputting the first textural features of the first effective area image into the first-level age classifier to obtain first-level age groups corresponding to the first effective area image and first weights of the first-level age groups; selecting a second-level age classifier according to a particular first-level age group with a highest first weight among the first-level age groups; inputting the first textural features of the first effective area image into the second-level age classifier to obtain second-level age groups corresponding to the first effective area image and second weights of the second-level age groups; selecting a third-level age classifier according to a particular second-level age group with a highest second weight among the second-level age groups; inputting the first textural features of the first effective area image into the third-level age classifier to obtain a third-level age corresponding to the first effective area image; and obtaining an age property of the face according to the third-level age, the first weights of the first-level age groups and the second weights of the second-level age groups.

In certain embodiments, an age classifier $f_{age}^1$, corresponding to a race property and a gender property is selected, and an age group $l_1$ corresponding to the image sample to be tested and the weight $p_1$ under each class are obtained. For example, the weight $p_1$ corresponds to a SVM classification output, $[l_1, p_1] = f_{age}^1(x)$. As an example, all classifier outputs are real numbers each representing a probability to be classified into a current class and a weight corresponds to the probability.

In some embodiments, the age groups of an image sample to be tested and the training image samples are different in order to improve the coverage of age groups. For the image sample to be tested, the age ranges are (0-5) for infants, (3-20) for children, (15-50) for youths and (>45) for seniors. For the output age group $l_1$, a second-level age classifier $f_{age}^2$ is selected under the age group to obtain age subgroups $l_2$ with an interval of five years and the corresponding weight $p_2$, where $[l_2, p_2] = f_{age}^2(x)$.

In certain embodiments, n age groups with highest weights are selected. For example, a corresponding age classifier $f_{age}^3$ for each age group is selected to calculate the age of the current sample: $age^t = f_{age}^3(x)$, $t=1, 2 \ldots n$. As an example, the final facial age output is $$age = \Sigma age^t * p_1^t * p_2^t.$$

In some embodiments, the method 100 and/or the method 200 can be used for age-based access control at Internet cafes and cinemas, or login authorization for limiting minors' access to some adult websites. For example, the method 100 and/or the method 200 can also be used to automatically collect property data of users, e.g., in trading markets, to obtain useful social information of users which can be used for customer analysis. As an example, the method 100 and/or the method 200 can be implemented without causing any disturbance to users. For instance, some malls, hotels and hospitals can use the method 100 and/or the method 200 to analyze background information of customers and patients to make more accurate market judgment. Furthermore, the method 100 and/or the method 200 can be used for user property analysis in order to provide more targeted advertising services and improve the audience accuracy.

Figure 5:
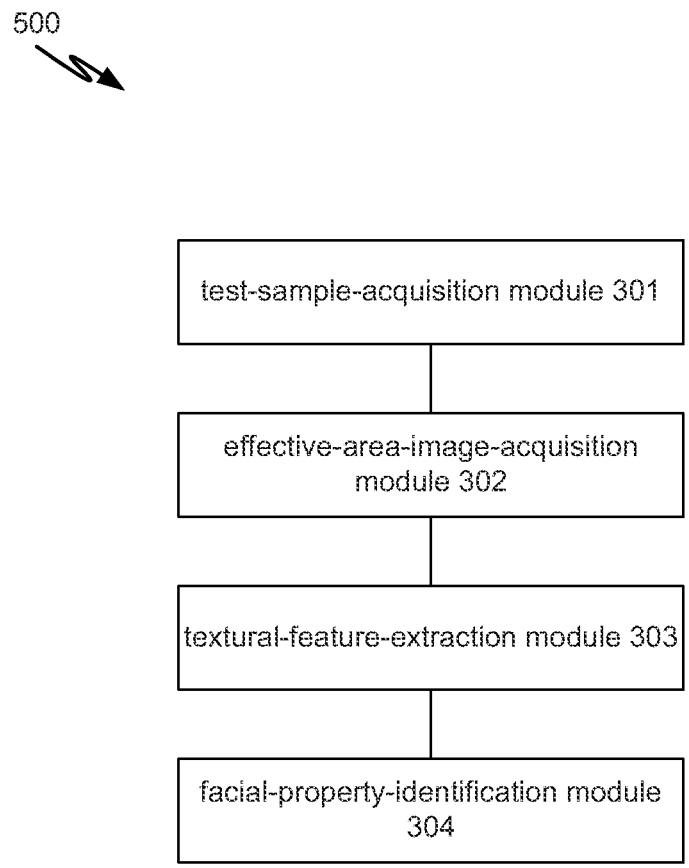
FIG. 5 is a simplified diagram showing a system for facial property identification according to one embodiment of the present invention.

FIG. 5 is a simplified diagram showing a system for facial property identification according to one embodiment of the present invention. This diagram is merely an example, which should not unduly limit the scope of the claims. One of ordinary skill in the art would recognize many variations, alternatives, and modifications. The system 500 includes: a test-sample-acquisition module 301, an effective-area-image-acquisition module 302, a textural-feature-extraction module 303 and a facial-property-identification module 304.

According to one embodiment, the test-sample-acquisition module 301 is configured to acquiring an image sample. For example, the effective-area-image-acquisition module 302 is configured to acquire a first effective area image of a face in the image sample. In another example, the textural-feature-extraction module 303 is configured to extract first textural features of the first effective area image. As an example, the facial-property-identification module 304 is configured to classify the first textural features of the first effective area image by race, gender and age using a race classifier, a gender classifier and an age classifier successively to obtain a race property, a gender property and an age property of the face.

According to another embodiment, the textural-feature-extraction module 303 includes a BIM-feature-extraction unit configured to extract biologically inspired model (BIM) features within the first effective area image of the face. For example, the BIM-feature-extraction unit is further configured to: a) establish 64 sets of gabor filters and filtering the first effective area image of the face in 16 scales and 4 orientations using the 64 sets of gabor filters to obtain a gabor image; b) divide the gabor image into 8 parts, wherein a part includes two scales and four orientations; c) in an orientation of a part, select one set of m×n masks and dividing the gabor image to obtain two sets of serial gabor features; and d) compare gabor features corresponding to the two scales of the part and taking a higher value of corresponding feature dimensions as a final feature output; adjust sizes of the masks; and repeat the operations c)-d) for k times to obtain k×4×8 sets of BIM features of the first effective area image of the face. For example, after obtaining k×4×8 sets of BIM features of the face within the effective area image, the BIM-feature-extraction unit is further configured to perform principal component analysis (PCA) dimensionality reduction on the k×4×8 sets of BIM features to obtain the first textual features.

Figure 6:
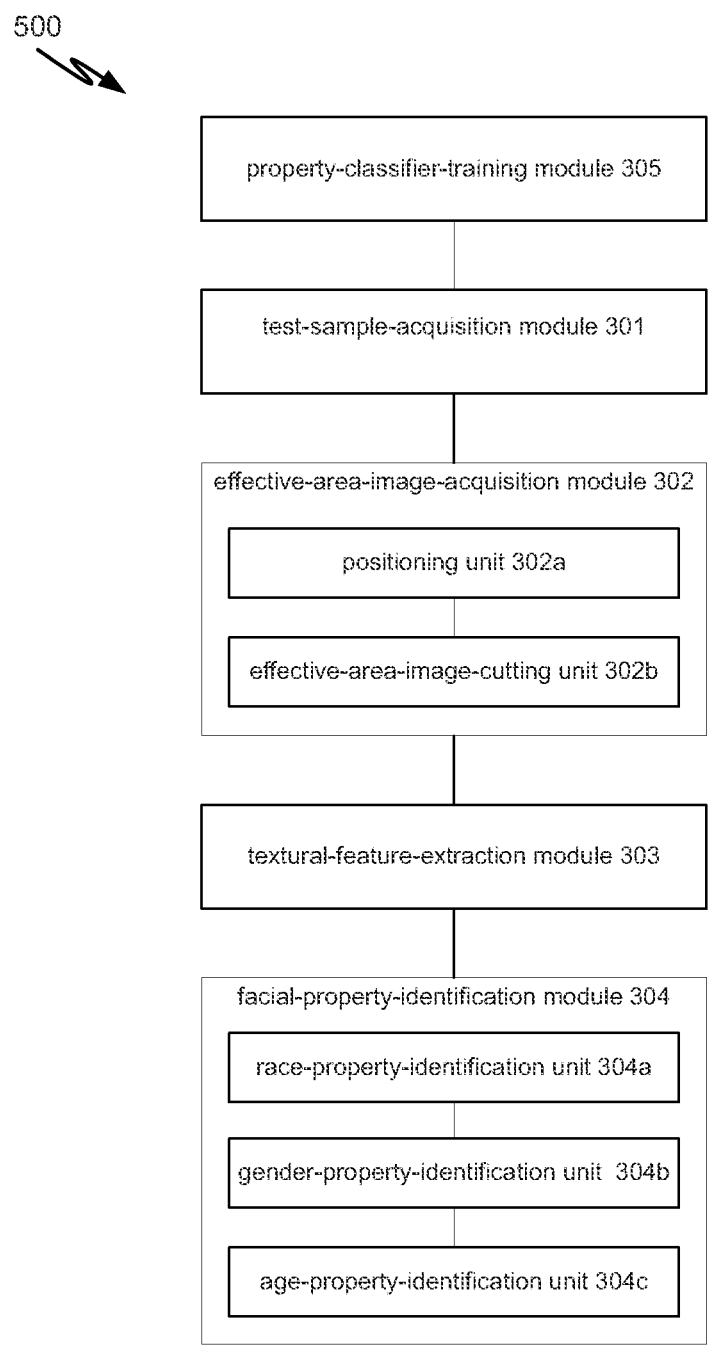
FIG. 6 is a simplified diagram showing a system for facial property identification according to another embodiment of the present invention.

FIG. 6 is a simplified diagram showing the system 500 for facial property identification according to another embodiment of the present invention. This diagram is merely an example, which should not unduly limit the scope of the claims. One of ordinary skill in the art would recognize many variations, alternatives, and modifications. The system 500 further includes a property-classifier-training module 305 configured to establish a race classifier, a gender classifiers and an age classifier successively.

According to one embodiment, the effective-area-image-acquisition module 302 includes: a positioning unit 302a configured to detect the face in the image sample and determine eye positions on the face; and an effective-area-image-cutting unit 302b configured to calibrate an original image of the face based on the eye positions on the face and obtain the first effective area image of the face within a predetermined area centering on the eyes of the face. According to another embodiment, the facial-property-identification module 304 includes: a race-property-identification unit 304a configured to classify the first textural features of the first effective area image by race with a race classifier to obtain a race property of the face, a gender-property-identification unit 304b configured to select a gender classifier corresponding to the race property of the face and classify the first textual features of the first effective area image by gender with the gender classifier to obtain a gender property of the face, and an age-property-identification unit 304c configured to select an age classifier corresponding to the race property and the gender property of the face and classify the first textural features of the first effective area image by age with the age classifier to obtain an age property of the face.

In some embodiments, the age-property-identification unit 304c is further configured to: select a first-level age classifier corresponding to the race property and the gender property of the face; input the first textural features of the first effective area image into the first-level age classifier to obtain first-level age groups corresponding to the first effective area image and first weights of the first-level age groups; select a second-level age classifier according to a particular first-level age group with a highest first weight among the first-level age groups; input the first textural features of the first effective area image into the second-level age classifier to obtain second-level age groups corresponding to the first effective area image and second weights of the second-level age groups; select a third-level age classifier according to a particular second-level age group with a highest second weight among the second-level age groups; input the first textural features of the first effective area image into the third-level age classifier to obtain a third-level age corresponding to the first effective area image; and obtain an age property of the face according to the third-level age, the first weights of the first-level age groups and the second weights of the second-level age groups.

Figure 7:
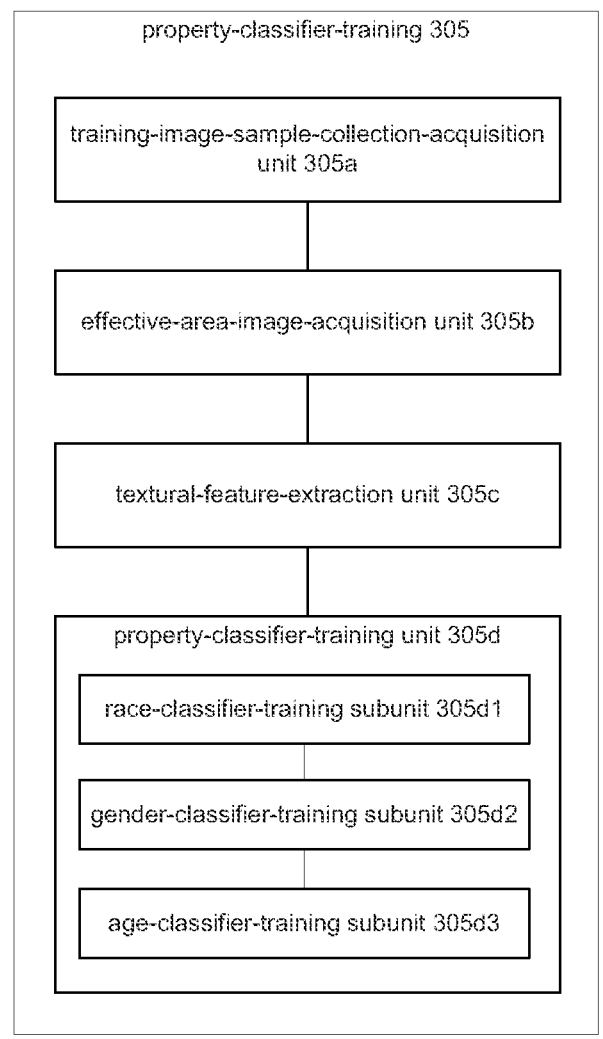
FIG. 7 is a simplified diagram showing a property-classifier-training module as part of a system for facial property identification according to one embodiment of the present invention.

FIG. 7 is a simplified diagram showing the property-classifier-training module 305 as part of the system 500 according to one embodiment of the present invention. This diagram is merely an example, which should not unduly limit the scope of the claims. One of ordinary skill in the art would recognize many variations, alternatives, and modifications.

According to one embodiment, the property-classifier-training module 305 includes: a training-image-sample-collection-acquisition unit 305a configured to acquire a training image sample collection; an effective-area-image-acquisition unit 305b configured to acquire a second effective area image in an image sample in the training image sample collection; a textural-feature-extraction unit 305c configured to extract second textural features of the second effective area image; and a property-classifier-training unit 305d configured to establish the race classifier, the gender classifier and the age classifier successively based on at least information associated with the second textural features of the second effective area images in the training image sample collection.

According to another embodiment, the property-classifier-training unit 305d comprises: a race-classifier-training subunit 305d1 configured to divide the training sample collection into white training samples, black training samples and yellow training samples corresponding to a white race, a black race and a yellow race respectively; and train third textural features of the white training samples, the black training samples and the yellow training samples separately to obtain a ternary classifier associated with the white race, the black race and the yellow race. According to yet another embodiment, the property-classifier-training unit 305d includes a gender-classifier-training subunit 305d2 configured to divide the white training samples, the black training samples and the yellow training samples by gender to obtain gender samples of each race and train fourth textural features of the gender samples of each race separately to obtain a gender binary classifier associated with each race, wherein the binary classifier corresponds to male and female.

In one embodiment, the property-classifier-training unit 305d includes an age-classifier-training subunit 305d3 configured to: divide the gender samples of each race by age groups to obtain infant training samples, child training samples, youth training samples and senior training samples; train the infant training samples, the child training samples, the youth training samples and the senior training samples to establish a first-level age classifier; train fifth textural features of second-level training samples associated with an age interval of five years related to the infant training samples, the child training samples, the youth training samples and the senior training samples to establish a second-level age classifier; and train a linearly-fit third-level age classifier for the infant training samples, the child training samples, the youth training samples and the senior training samples based on at least information associated with an age interval of five years.

According to one embodiment, a method is provided for facial property identification. For example, an image sample is acquired; a first effective area image of a face is acquired in the image sample; first textural features of the first effective area image are extracted; and the first textural features of the first effective area image are classified by race, gender and age using a race classifier, a gender classifier and an age classifier successively to obtain a race property, a gender property and an age property of the face. For example, the method is implemented according to at least FIG. 1, and/or FIG. 2.

According to another embodiment, a system for facial property identification includes: a test-sample-acquisition module, an effective-area-image-acquisition module, a textural-feature-extraction module, and a facial-property-identification module. The test-sample-acquisition module is configured to acquiring an image sample. The effective-area-image-acquisition module is configured to acquire a first effective area image of a face in the image sample. The textural-feature-extraction module is configured to extract first textural features of the first effective area image. The facial-property-identification module is configured to classify the first textural features of the first effective area image by race, gender and age using a race classifier, a gender classifier and an age classifier successively to obtain a race property, a gender property and an age property of the face. For example, the system is implemented according to at least FIG. 5, FIG. 6, and/or FIG. 7.

According to yet another embodiment, a non-transitory computer readable storage medium includes programming instructions for facial property identification. The programming instructions are configured to cause one or more data processors to execute operations. For example, an image sample is acquired; a first effective area image of a face is acquired in the image sample; first textural features of the first effective area image are extracted; and the first textural features of the first effective area image are classified by race, gender and age using a race classifier, a gender classifier and an age classifier successively to obtain a race property, a gender property and an age property of the face. For example, the storage medium is implemented according to at least FIG. 1, and/or FIG. 2.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention is combined.

Additionally, the methods and systems described herein is implemented on many different types of processing devices by program code comprising program instructions that are executable by the device processing subsystem. The software program instructions includes source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) is stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods is provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein is connected directly or indirectly to each other in order to allow the flow of data needed for their operations. It is also noted that a module or processor includes but is not limited to a unit of code that performs a software operation, and is implemented for example as a subroutine unit of code, or as a software function unit of code, or as an object (as in an object-oriented paradigm), or as an applet, or in a computer script language, or as another type of computer code. The software components and/or functionality is located on a single computer or distributed across multiple computers depending upon the situation at hand.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope or of what is claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features is described above as acting in certain combinations and even initially claimed as such, one or more features from a claimed combination can in some cases be excised from the combination, and the claimed combination is directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing is advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for facial property identification, the method comprising:
    acquiring an image sample;
    acquiring a first effective area image of a face in the image sample;
    extracting first textural features of the first effective area image;
    classifying the first textural features of the first effective area image by race, gender and age using a race classifier, a gender classifier and an age classifier successively to obtain a race property, a gender property and an age property of the face; and
    establishing the race classifier, the gender classifier and the age classifier successively using steps comprising:
        acquiring a training image sample collection;
        acquiring a second effective area image in an image sample in the training image sample collection;
        extracting second textural features of the second effective area image; and
        establishing the race classifier, the gender classifier and the age classifier successively based on at least information associated with the second textural features of the second effective area images in the training image sample collection;
    wherein the establishing the race classifier based on at least information associated with the second textural features in the training image sample collection comprises:
        dividing the training sample collection into white training samples, black training samples and yellow training samples corresponding to a white race, a black race and a yellow race respectively; and
        training third textural features of the white training samples, the black training samples and the yellow training samples separately to obtain a ternary classifier associated with the white race, the black race and the yellow race;
    wherein the establishing the gender classifier based on at least information associated with the second textural features in the training image sample collection comprises:
        dividing the white training samples, the black training samples and the yellow training samples by gender to obtain gender samples of each race; and
        training fourth textural features of the gender samples of each race separately to obtain a gender binary classifier associated with each race, wherein the binary classifier corresponds to male and female; and wherein the establishing the age classifier based on at least information associated with the second textural features in the training image sample collection comprises:

dividing the gender samples of each race by age groups to obtain infant training samples, child training samples, youth training samples and senior training samples;

training the infant training samples, the child training samples, the youth training samples and the senior training samples to establish a first-level age classifier;

training fifth textural features of second-level training samples associated with an age interval of five years related to the infant training samples, the child training samples, the youth training samples and the senior training samples to establish a second-level age classifier; and training a linearly-fit third-level age classifier for the infant training samples, the child training samples, the youth training samples and the senior training samples based on at least information associated with an age interval of five years.

2. A method for facial property identification, the method comprising:

acquiring an image sample;

acquiring a first effective area image of a face in the image sample;

extracting first textural features of the first effective area image; and classifying the first textural features of the first effective area image by race, gender and age using a race classifier, a gender classifier and an age classifier successively to obtain a race property, a gender property and an age property of the face, wherein the classifying the first textural features of the first effective area image by race, gender and age using a race classifier, a gender classifier and an age classifier successively to obtain a race property, a gender property and an age property of the face comprises:

classifying the first textural features of the first effective area image by race with a race classifier to obtain a race property of the face;

selecting a gender classifier corresponding to the race property of the face;

classifying the first textural features of the first effective area image by gender with the gender classifier to obtain a gender property of the face;

selecting an age classifier corresponding to the race property and the gender property of the face; and classifying the first textural features of the first effective area image by age with the age classifier to obtain an age property of the face; and wherein the selecting a gender classifier corresponding to the race property of the face and the classifying the first textural features of the first effective area image by gender with the gender classifier to obtain a gender property of the face comprises:

selecting a first-level age classifier corresponding to the race property and the gender property of the face;

inputting the first textural features of the first effective area image into the first-level age classifier to obtain first-level age groups corresponding to the first effective area image and first weights of the first-level age groups;

selecting a second-level age classifier according to a particular first-level age group with a highest first weight among the first-level age groups;

inputting the first textural features of the first effective area image into the second-level age classifier to obtain second-level age groups corresponding to the first effective area image and second weights of the second-level age groups;

selecting a third-level age classifier according to a particular second-level age group with a highest second weight among the second-level age groups;

inputting the first textural features of the first effective area image into the third-level age classifier to obtain a third-level age corresponding to the first effective area image; and obtaining an age property of the face according to the third-level age, the first weights of the first-level age groups and the second weights of the second-level age groups.

3. A system for facial property identification, comprising:

a test-sample-acquisition module configured to acquiring an image sample;

an effective-area-image-acquisition module configured to acquire a first effective area image of a face in the image sample;

a textural-feature-extraction module configured to extract first textural features of the first effective area image;

a facial-property-identification module configured to classify the first textural features of the first effective area image by race, gender and age using a race classifier, a gender classifier and an age classifier successively to obtain a race property, a gender property and an age property of the face; and a property-classifier-training module configured to establish the race classifier, the gender classifier and the age classifier successively, wherein the property-classifier-training module includes:

a training-image-sample-collection-acquisition unit configured to acquire a training image sample collection;

an effective-area-image-acquisition unit configured to acquire a second effective area image in an image sample in the training image sample collection;

a textural-feature-extraction unit configured to extract second textural features of the second effective area image; and a property-classifier-training unit configured to establish the race classifier, the gender classifier and the age classifier successively based on at least information associated with the second textural features of the second effective area images in the training image sample collection, wherein the property-classifier-training unit comprises:

a race-classifier-training subunit configured to divide the training sample collection into white training samples, black training samples and yellow training samples corresponding to a white race, a black race and a yellow race respectively; and train third textural features of the white training samples, the black training samples and the yellow training samples separately to obtain a ternary classifier associated with the white race, the black race and the yellow race;

a gender-classifier-training subunit configured to divide the white training samples, the black training samples and the yellow training samples by gender to obtain gender samples of each race and train fourth textural features of the gender samples of each race separately to obtain a gender binary classifier associated with each race, wherein the binary classifier corresponds to male and female; and an age-classifier-training subunit configured to:
   divide the gender samples of each race by age groups to obtain infant training samples, child training samples, youth training samples and senior training samples;
   train the infant training samples, the child training samples, the youth training samples and the senior training samples to establish a first-level age classifier;
   train fifth textural features of second-level training samples associated with an age interval of five years related to the infant training samples, the child training samples, the youth training samples and the senior training samples to establish a second-level age classifier; and
   train a linearly-fit third-level age classifier for the infant training samples, the child training samples, the youth training samples and the senior training samples based on at least information associated with an age interval of five years.

4. A system for facial property identification, comprising:
a test-sample-acquisition module configured to acquiring an image sample;
an effective-area-image-acquisition module configured to acquire a first effective area image of a face in the image sample;
a textural-feature-extraction module configured to extract first textural features of the first effective area image; and
a facial-property-identification module configured to classify the first textural features of the first effective area image by race, gender and age using a race classifier, a gender classifier and an age classifier successively to obtain a race property, a gender property and an age property of the face, wherein the facial-property-identification module comprises:

a race-property-identification unit configured to classify the first textural features of the first effective area image by race with the race classifier to obtain a race property of the face;
a gender-property-identification unit configured to select the gender classifier corresponding to the race property of the face and classify the first textural features of the first effective area image by gender with the gender classifier to obtain a gender property of the face; and
an age-property-identification unit configured to select the age classifier corresponding to the race property and the gender property of the face and classify the first textural features of the first effective area image by age with the age classifier to obtain an age property of the face, wherein the age-property-identification unit is further configured to:
   select a first-level age classifier corresponding to the race property and the gender property of the face;
   input the first textural features of the first effective area image into the first-level age classifier to obtain first-level age groups corresponding to the first effective area image and first weights of the first-level age groups;
   select a second-level age classifier according to a particular first-level age group with a highest first weight among the first-level age groups;
   input the first textural features of the first effective area image into the second-level age classifier to obtain second-level age groups corresponding to the first effective area image and second weights of the second-level age groups;
   select a third-level age classifier according to a particular second-level age group with a highest second weight among the second-level age groups;
   input the first textural features of the first effective area image into the third-level age classifier to obtain a third-level age corresponding to the first effective area image; and
   obtain an age property of the face according to the third-level age, the first weights of the first-level age groups and the second weights of the second-level age groups.

* * * * *